WIND TUNNEL WITH A CONTROLLED MEANS TO PRODUCE HIGH ENERGY GAS STREAMS

Filed Sept. 5, 1957

INVENTORS
DANIEL E. BLOXSOM, JR.
BARRY V. RHODES

United States Patent Office 2,995,035
Patented Aug. 8, 1961

2,995,035

WIND TUNNEL WITH A CONTROLLED MEANS TO PRODUCE HIGH ENERGY GAS STREAMS

Daniel Edgar Bloxsom, Jr., 16750 Simonds, Granada Hills, Calif., and Barry V. Rhodes, 22227 Runnymede, Canoga Park, Calif.

Filed Sept. 5, 1957, Ser. No. 682,263
4 Claims. (Cl. 73—147)
(Granted under Title 35, U.S. Code (1952), sec. 266)

Figures 1, 2:
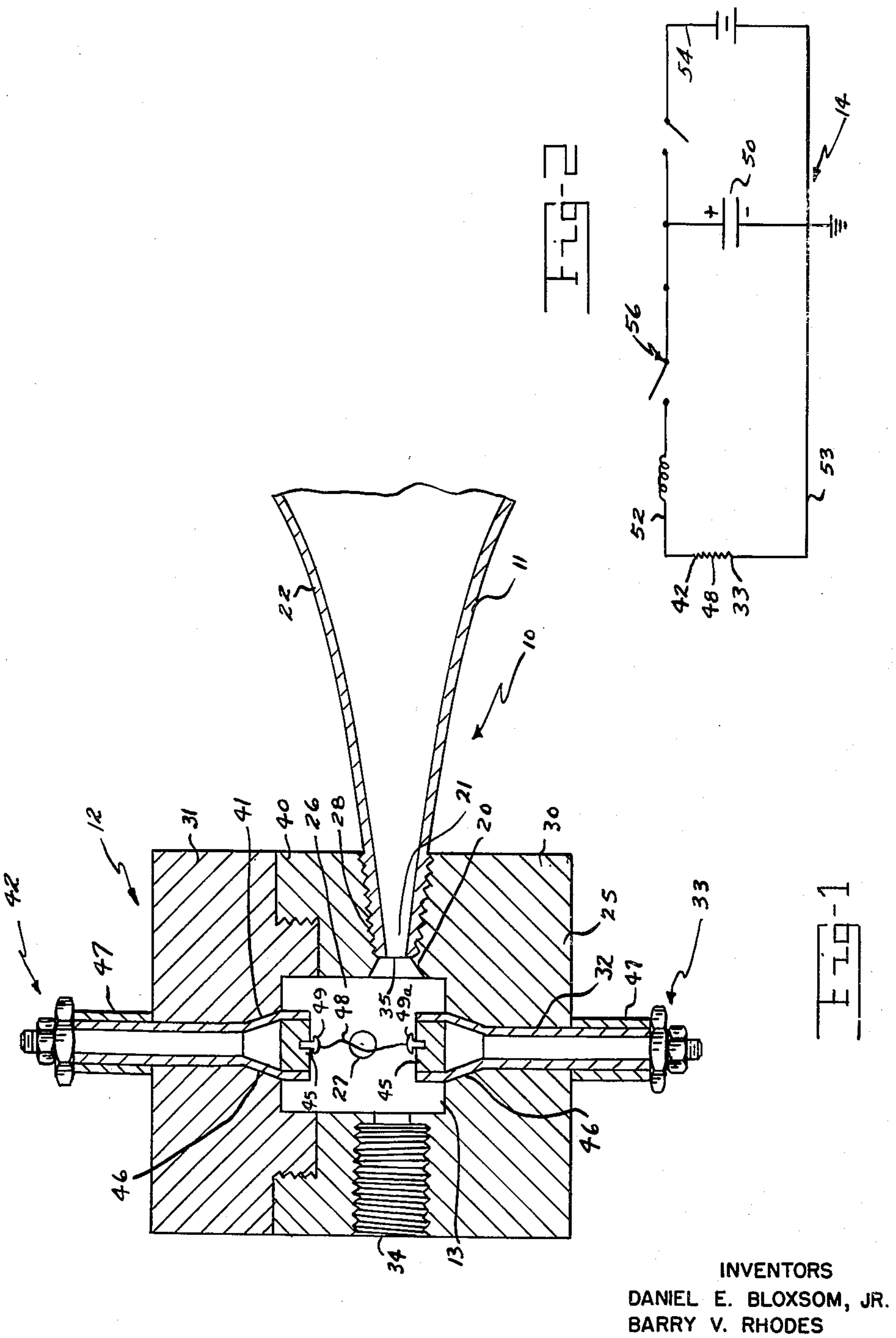

The invention described herein may be manufactured and used by or for the United States Government for governmental purposes without payment to us of any royalty thereon.

The present invention is related to a means for producing high temperature and high pressure gases.

The present invention has more particular relation to a wind tunnel in which there is provided a controllable means for producing high temperature, high pressure gases for direct expansion through a high speed nozzle for acceleration to hypersonic speeds. As an example, where it is desired to simulate free flight conditions such as for ballistic missile testing or other high speed flight devices, it is necessary to accelerate a gas or some working fluid to speeds on the order of Mach 20 to 30. To develop these high speeds the gas must be supplied at an extremely high initial temperature and pressure in order to produce the given speed upon acceleration, together with a given stagnation temperature and pressure which would exist at the given speed and at a given altitude in free flight. As a result, it is not uncommon to require an initial temperature of 10,000–12000° K. and a pressure in excess of one atmosphere to produce a Mach number above 20.

In order to supply a gas at the necessary pressure and temperature, primary consideration must be given to some feasible way of heating the gas to the desired given temperature over a minimum duration of time so as to prevent undue heat losses along with erosion of the chamber in which the gas is being heated. Also, some feasible means must be provided which is capable of supplying the necessary energy to the gas in a minimum length of time approaching an instantaneous transfer of heat energy to the entire volume of gas to be heated. Moreover, once the gas has been elevated to the desired temperature and pressure level some means must be provided for the direct expansion of the gas through the wind tunnel without loss of energy through heat transfer and friction.

It is, therefore, proposed in accordance with the present invention to confine a predetermined quantity of gas within a chamber of near minimum surface-to-volume ratio adjacent the entrance to a wind tunnel nozzle and then to raise the gas to an extremely high temperature and pressure level by the substantially instantaneous transfer of electrical energy uniformly through the gas for its direct expansion through the nozzle. To realize the instantaneous and uniform transfer of energy to the gas along with the direct, immediate expansion of the gas through the nozzle it has been found advantageous to provide a blow-down type wind tunnel wherein the gas is introduced into the chamber at a high pressure and density; a source of electrical energy is then provided which can be selectively controlled to develop a high energy level storage bank together with mechanism for instantaneously discharging the energy source across the confined gas in the form of heat energy. Upon heating and raising the gas to a predetermined pressure level the gas is then adapted to release itself through a rupturable outlet in the chamber for direct expansion through the nozzle.

Accordingly, it is an object to provide for the acceleration of a gas to hypersonic speeds under conditions simulating free flight conditions at a given altitude and for a given speed.

It is another object to provide for the instantaneous transfer of heat to a confined gas for the development of exceedingly high temperatures and pressures for the acceleration of the gas through a high speed nozzle to hypersonic speeds and at a predetermined temperature and pressure.

It is a further object to provide for an electrical heater apparatus so constructed and arranged in combination with a high speed nozzle as to produce the instantaneous transfer of energy in the form of heat to a confined gas for the development of a high temperature, high pressure gas adaptable for direct expansion through the nozzle to hypersonic speeds on the order of Mach numbers 20 to 30 and under simulated free flight conditions.

It is still a further object to provide for the preparation of a gas or working fluid for its acceleration through a hypersonic wind tunnel nozzle to a predetermined speed and at a given temperature and pressure by the instantaneous electrical discharge of a high voltage source of energy across a chamber of minimum surface-to-volume ratio in which the gas is confined.

Complete understanding of the present invention may be gained from the following detailed description taken in connection with the accompanying drawings in which:

FIG. 1 is a longitudinal, section view of a wind tunnel nozzle of the blow-down type together with a heater apparatus to produce a high temperature, high pressure gas for direct expansion through the nozzle; and FIG. 2 is a circuit diagram of the electrical circuit of the heater apparatus in accordance with the present invention.

In the drawing, there is shown an application of the present invention to a hypersonic wind tunnel 10 including a high speed flow nozzle 11 connected directly into a heater apparatus 12 which is in turn made up of a stagnation chamber 13 and an electrical discharge apparatus 14.

The flow nozzle 11, commonly termed a de Lavel nozzle, consists of an entrance 20 leading into a throat section 21 and a divergent test section 22 wherein a testing model is located at the exhaust end (not shown) of the test section 22. The dimensions of the nozzle 11 are of course governed in accordance with the desired speed of gas flow through the exhaust end of the test section with the expansion ratio between the throat and exhaust end determining the relative sizes of the throat and test section respectively for expansion of a given quantity of gas. The nozzle itself can be composed preferably of steel and with a smooth inner wall surface to provide for a smooth, uniform flow of gas therethrough. Suitable cooling means (not shown) may also be provided along the critical heat transfer region in the nozzle, but which are not shown since it forms no part of the present invention.

The stagnation chamber 13 of the heater apparatus 12 is formed to provide a receptacle of near minimum surface-to-volume ratio in which a gas may be prepared for direct expansion through the flow nozzle 11. For this purpose, the stagnation chamber 13 is comprised broadly of a cylindrical bomb or housing 25 having a totally inclosed receptacle portion 26 with a pressure inlet 27 communicating with the receptacle for the supply of gas into the chamber and a closable outlet 28 interconnecting the receptacle 26 and entrance section 20 of the nozzle for discharge of the gas through the nozzle when the gas reaches a predetermined pressure level.

The bomb 25 is preferably thick-walled and is formed in two sections comprising a bottom electrode or cathode section 30 and a top electrode or anode section 31. The bottom electrode section 30 is provided with a central cylindrical opening which forms the receptacle 26 and an electrode receiving opening 32 converging outwardly from the end of the receptacle through the wall of the bomb for placement of a cathode 33. In addition, a pressure measuring opening 34 extends outwardly from one side of the receptacle 26 for positioning of a suitable measuring device (not shown) and a threaded opening forming the closable outlet 28 extends from the opposite side of the receptacle for connection of the entrance section 20. The pressure inlet 27 extends into the side of the receptacle between the closable outlet 28 and the pressure measuring opening 34 for supply of gas into the receptacle.

To confine the gas within the receptacle up to a predetermined pressure level the outlet 28 is made closable by the placement of a diaphragm 35 across the innermost end of the outlet adjacent the nozzle entrance 20 with the diaphragm being of a thickness and material which will rupture once the gas has reached a predetermined pressure.

Extending upwardly from the opposite end of the receptacle 26 is an annular shoulder 40 which is interiorly threaded for connection of the top electrode section 31. The top electrode section 31 is also provided with an outwardly converging electrode receiving opening 41 for placement of an anode member 42. Thus, in connected relation with the lower cathode section 30, the anode 31 closes the opposite end of the receptacle to form the enclosed stagnation chamber or receptacle 26. In the preferred form, both the cathode 33 and the anode 42 may be formed of steel terminal plugs 45 positioned flush with the ends of the receptacle and proceeding outwardly from the wall surface of the pump. A lava or glass insulating layer 46 may be disposed about the plugs 45 with an outer Micarta shielding layer 47 disposed about the projecting ends of the electrodes to prevent additional gas from being produced during the energizing cycle.

For electrical connection of the cathode 33 and the anode 42, a teaser or initiating wire 48 may be fixed to the receptacle sides of the electrodes so as to stretch across the gap within the receptacle and between the anode and cathode. To prevent the teaser wire from touching the walls of the receptacle, it is first made up and fixed to the anode by means of a suitable screw 49, then lowered and fixed to the cathode by a screw 49*a* before assembly of the chamber. The teaser wire 48 may be composed of a thin and flexible wire which is adaptable to break down the gap in a reliable and reproducible manner between the anode and cathode at a predetermined potential level. A thin, bare length of No. 35 copper wire has been found suitable for this purpose with a portion of the wire being rewound along half its length in order to withstand the sudden charge which occurs at the time the switch 56 in the circuit breaks down, as will be hereinafter described.

The size of the stagnation chamber 25 will, of course, be determined by the quantity of gas necessary for expansion through the wind tunnel nozzle. To withstand the high temperature and pressure developed in the chamber the bomb 30 was constructed to exceed 60,000 p.s.i. ultimate pressure for the spark heating of the gas. The purified gas or compressible fluid to be used can then be pumped into the receptacle 26 through the pressure inlet 27, preferably in a high density state in order to increase the heat transfer rate throughout the gas from the electrical discharge. The gas itself is preferably helium, although it is possible to utilize any gas or fluid which will exhibit favorable heating and expansion characteristics and is capable of rapidly absorbing heat energy from an electrical source for direct expansion through the wind tunnel.

In order to provide the necessary energy for the instantaneous transfer of heat to the confined gas, the electrical discharge apparatus 14 is connected across the terminals of the cathode 33 and the anode 42 for energizing the teaser wire 48 to produce the necessary electrical potential between the electrodes. The electrical circuit as shown in FIG. 2 is comprised essentially of a capacitance or inductance storage bank 50 connected in parallel with the electrodes 33 and 42 by means of leads 52 and 53 and with a charger or electrical power source 54 connected across the terminals of the storage bank for energizing the storage bank to the desired voltage value. To protect the teaser wire from breakdown as the storage bank 51 is being charged a switch 56 is provided including a spark gap which is rated to shield the main gap across the electrodes up to the desired potential level. Once the desired value is reached, the switch will then break down and the teaser wire will be initiated to instantaneously transfer the electrical energy across the electrode gap from the storage bank 50.

The desired energy level may be developed in the storage bank either by use of high capacitive condensers or inductance coils. Inductance coils have been effectively used by charging the coils to extremely high energy states which will establish a correspondingly high E.M.F. surrounding the coils; upon removal of the charger from the circuit the back E.M.F. may immediately be transferred across the electrode gap in the chamber to obtain extremely high heat transfer rates to the gas.

In the circuit, as shown, condensers are utilized as a storage bank which in a typical application may be charged to 10 kv. by means of an unfiltered D.C. power supply which acts as the charger 54; the switch 56 is accordingly rated to shield the electrodes from 10 kv. corona or breakdown.

To illustrate results obtained from the use of the above described circuit in combination with the stagnation chamber 13 as described, the chamber is filled with air at a density of 4.37 amagat. The spark across the air filled chamber is initiated by the teaser wire 48 at 10 kv. and was found to break down the gap within two microseconds and to heat the air within 50 microseconds to a temperature of 7300° K. at a final pressure of 2300 p.s.i.a A simulated Mach number in excess of 20 was produced in the test section upon expansion through the nozzle with a usable running time over .7 millisecond.

By applying the principles of the present invention it is possible to obtain even greater Mach numbers over longer running times merely by increasing the final temperature and pressure of the gas for a given density of gas. Such increases can be accomplished primarily by increasing the capacity of the discharge apparatus to provide a higher source of energy to the gas. Of course, the result obtained will always vary with the type of gas used, its initial density and pressure and also the expansion ratio in the nozzle itself.

Basic limitations of the use of any gas are present due to the heat transfer losses by convection and radiation to the chamber walls and erosion of the chamber walls when subjected to such high temperatures and pressures. In this respect, however, the present invention obviates the foregoing limitations to a considerable degree by achieving an extremely fast and uniform transfer of heat to the gas within the chamber followed by an immediate and direct expansion of the gas through the nozzle once the gas is heated to the desired condition.

It is to be understood that the embodiment of the present invention as shown and described is to be regarded as illustrative only and that the invention is susceptible to variations, modifications and changes within the scope of the appended claims.

We claim:

1. A wind tunnel including a nozzle adapted for the acceleration of gases to high velocities, a heater apparatus for preparing a quantity of gas to a predetermined temperature and pressure having a closed chamber of minimum surface-to-volume ratio, said chamber including an inlet for the introduction of a gas at a high density and a rupturable outlet member for discharge of the gas through said nozzle at a predetermined pressure level, means for delivering a predetermined quantity of gas at a predetermined density into said chamber; and an electric circuit having electrode members spaced across said chamber, an electric source of energy connected to said electrodes for developing an electric potential a capacitive storage bank for storing high potential electrical energy, and a teaser wire electrically connected between said electrodes to release electric energy from said source across said electrodes for the instantaneous transfer of heat to the gas in said chamber so as to increase the temperature and pressure of said gas to a level sufficient for discharge and acceleration through said nozzle to a predetermined velocity, temperature and pressure level.

2. In a wind tunnel of the blowdown type including a nozzle adapted for the acceleration of a gas to hypersonic speeds, the combination therewith of a heater apparatus comprising: a thick-walled chamber including a gas inlet and a closable outlet including a diaphragm member forming a closure for said outlet; means communicating with said gas inlet to supply a high density, high pressure gas into said chamber; and an electric circuit having a pair of shielded electrodes closing opposed ends of said chamber, a wire interconnecting said electrodes, capacitive discharge means connected in parallel relation with said electrodes for the development of an electrical potential thereacross, and an energy source for charging said capacitive discharge means to a predetermined potential including means to provide for the discharge of a potential across said electrodes at a predetermined level, said wire being of a material to provide for the instantaneous transfer of energy from said capacitive discharge means into the gas within said chamber for raising the gas to a predetermined temperature and pressure level, said diaphragm member being adapted to rupture at a predetermined pressure level for the flow of gas through said nozzle.

3. In a wind tunnel of the blowdown type including a nozzle adapted for the acceleration of a gas to hypersonic speeds, the combination therewith of an electric spark discharge heating apparatus comprising: a thick-walled chamber including a gas inlet and a closable outlet including a diaphragm member forming a closure for said outlet and with said outlet communicating with the entrance into said nozzle, means communicating with said gas inlet to supply a predetermined quantity of gas at a high pressure into said chamber, and an electric circuit having a pair of shielded electrodes closing opposed ends of said chamber, a teaser wire element interconnecting said electrodes, a capacitive storage bank connected in parallel relation with said electrodes for the discharge of an electrical potential thereacross, and a voltage source for charging said storage bank to a predetermined potential including a switch member to provide for the discharge of said storage bank across said electrodes at a predetermined potential, said wire being of a material to provide for the instantaneous transfer of energy from said storage bank into the gas within said chamber for raising the gas to a predetermined temperature and pressure level, said diaphragm member adapted to rupture at a predetermined pressure level for the direct expansion of the gas through said nozzle at a predetermined temperature and pressure.

4. In a wind tunnel including a nozzle adapted for the acceleration of gas to high velocities, the combination therewith of a heater apparatus for heating a quantity of gas to a predetermined temperature and pressure comprising a closed chamber including an inlet for the introduction of a gas therein and a rupturable outlet for discharge of the gas through said nozzle at a predetermined pressure level, means for delivering a predetermined quantity of gas into said chamber, a pair of spaced electrodes extending into said closed chamber and providing a discharge gap within the chamber, an electrical storage bank for storing high potential electrical energy, a source of electrical energy for charging said storage bank to a high electrical potential, a discharge circuit connecting said storage bank to the said electrodes in parallel relation, a switch for controlling said discharge circuit, and means for creating an ionized discharge path between said electrodes within said chamber to thereby substantially instantaneously discharge the energy in said storage bank as a high temperature high energy spark within said chamber, the heat released by said spark being absorbed by the gas confined within the chamber thereby raising the temperature and pressure, said rupturable outlet permitting discharge of said compressed gas at a predetermined pressure for flow through said nozzle at high velocity.

References Cited in the file of this patent

UNITED STATES PATENTS

| | | |
|---|---|---|
| 1,002,721 | Mathers | Sept. 5, 1911 |
| 1,608,825 | Wagner | Nov. 30, 1926 |
| 2,391,611 | Back | Dec. 25, 1945 |
| 2,728,877 | Fischer | Dec. 27, 1955 |
| 2,819,423 | Clark | Jan. 7, 1958 |
| 2,836,063 | Yoler et al. | May 27, 1958 |